United States Patent

Lozio

[15] 3,652,004
[45] Mar. 28, 1972

[54] DEVICE FOR FIXING LABELS TO A SUPPORTING BODY

[72] Inventor: Battista Lozio, Via Stefini 6, Milan, Italy

[22] Filed: May 5, 1970

[21] Appl. No.: 34,831

[30] Foreign Application Priority Data

Feb. 4, 1970 Italy..............................20221 A/70

[52] U.S. Cl.................................................227/67, 227/95
[51] Int. Cl...........................................................B25c 1/00
[58] Field of Search................................227/67, 68, 93, 95

[56] References Cited

UNITED STATES PATENTS

| | | | |
|---|---|---|---|
| 3,103,666 | 9/1963 | Bone | 227/67 |
| 2,952,851 | 9/1960 | Epstein | 227/68 |
| 3,185,367 | 5/1965 | Rieger et al. | 227/95 |
| 3,470,834 | 10/1969 | Bone | 227/67 X |

Primary Examiner—Granville Y. Custer, Jr.
Attorney—Stevens, Davis, Miller & Mosher

[57] ABSTRACT

A device for fixing labels to a supporting body, such as for example a fabric, by means of connecting elements consisting of a button and an anchoring body connected by a thin filament. The device comprises a hollow needle with a longitudinal slot, a piston which thrusts said anchoring body forward along said slot of said needle, a kinematic mechanism which feeds said connecting elements, assembled to form a unit, in continuous succession in such a manner that the anchoring body of each element is each time brought into alignment with said needle, and means for cutting each connecting element from said unit when the anchoring body of the element considered is thrust along the slot of said needle.

The kinematic mechanism which feeds the connecting elements in continuous succession is wholly contained in a piece house in a freely removable manner in the body of the device, and is not constrained with the other members of this latter.

4 Claims, 18 Drawing Figures

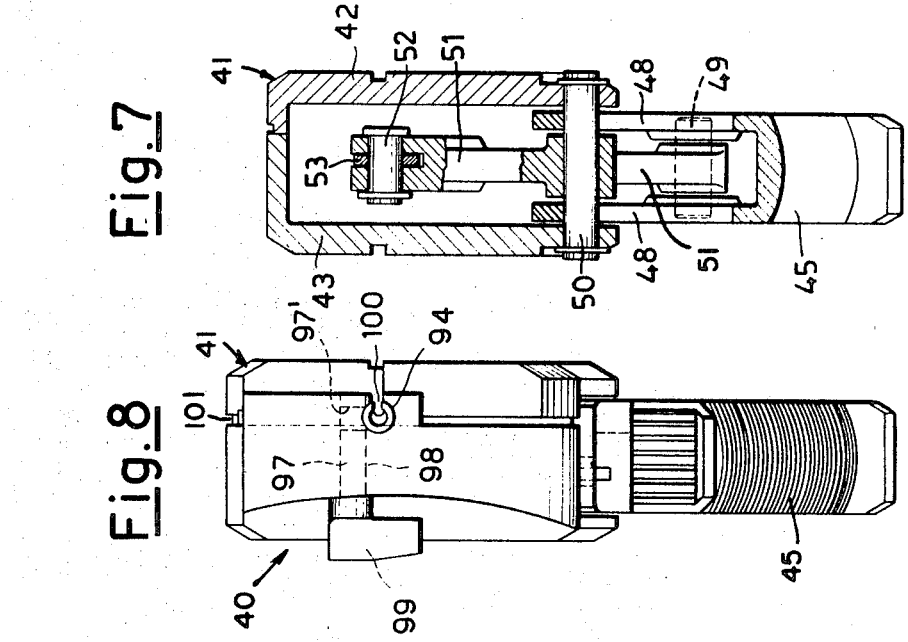
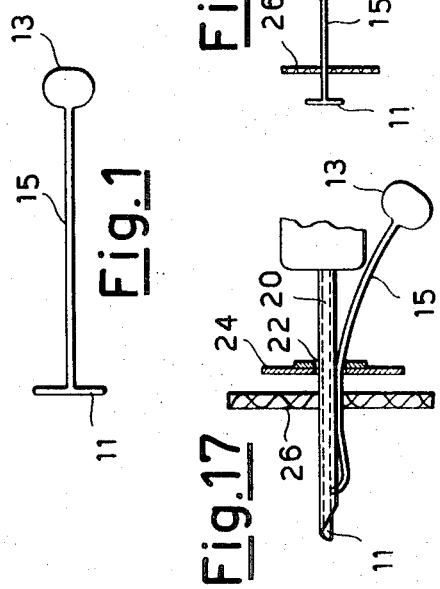

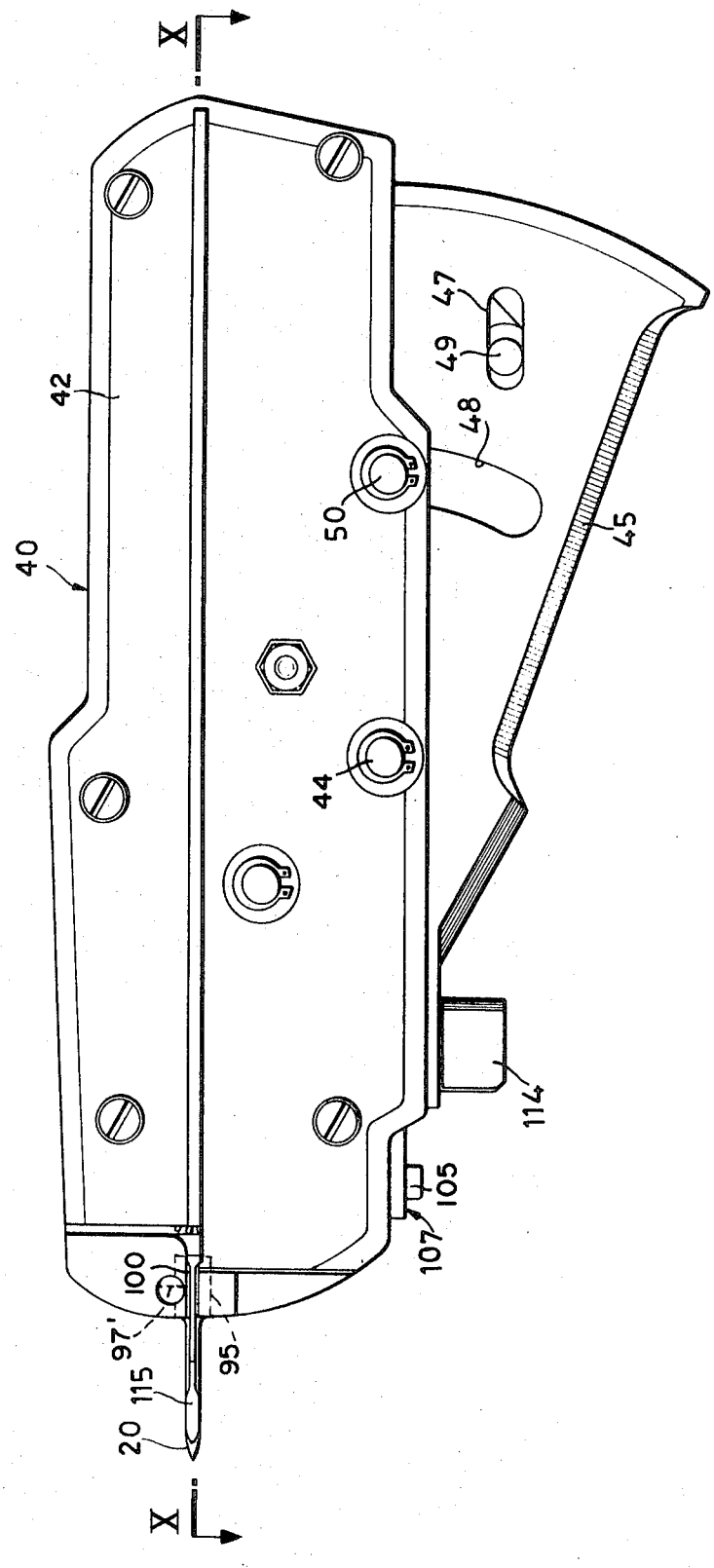

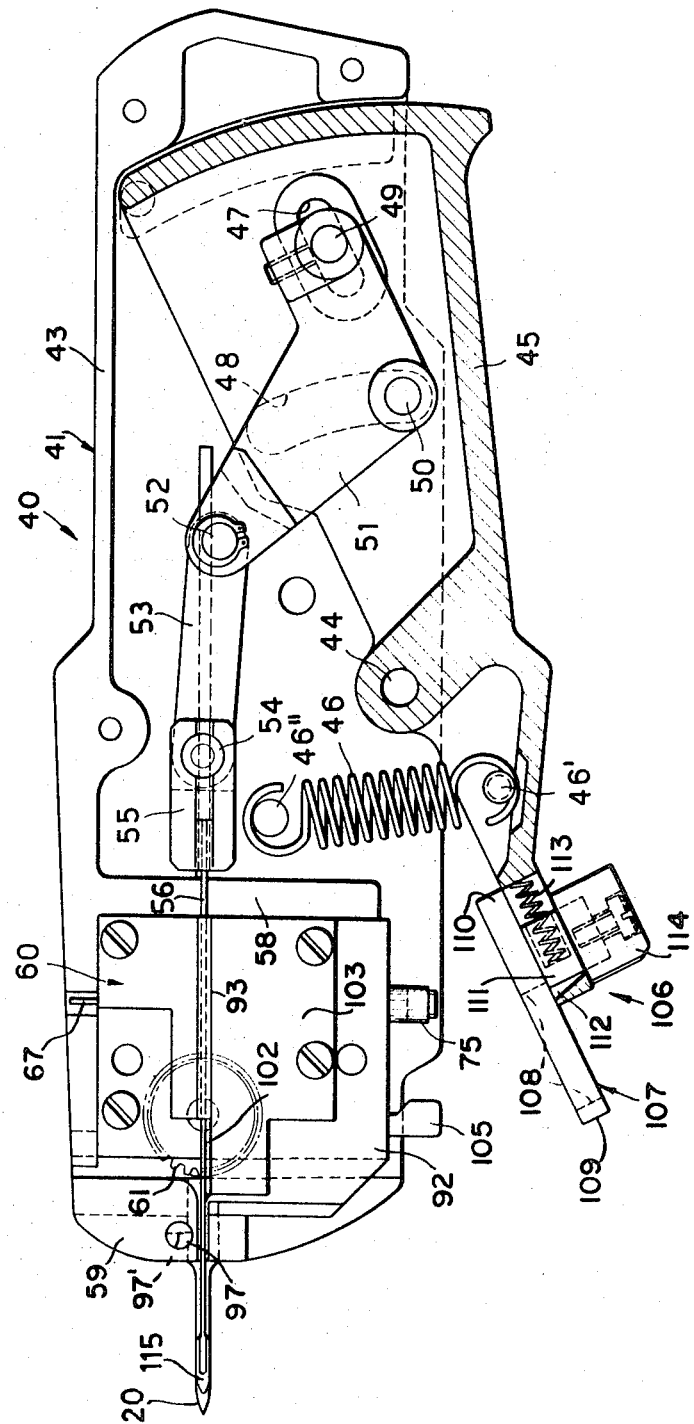

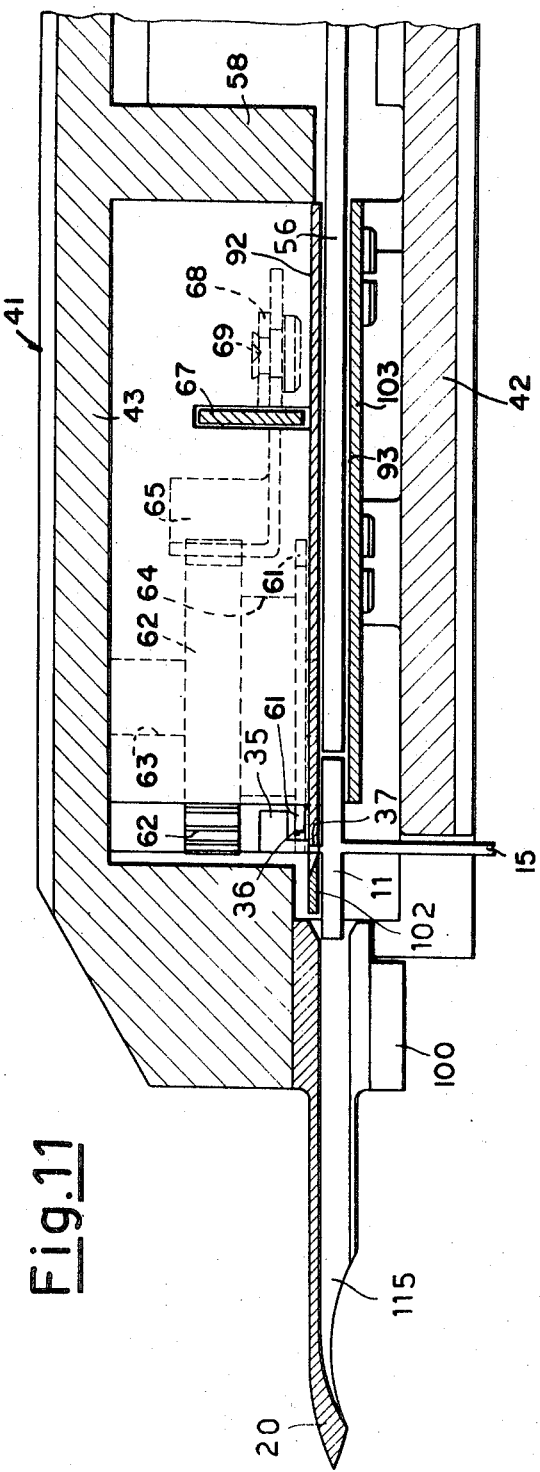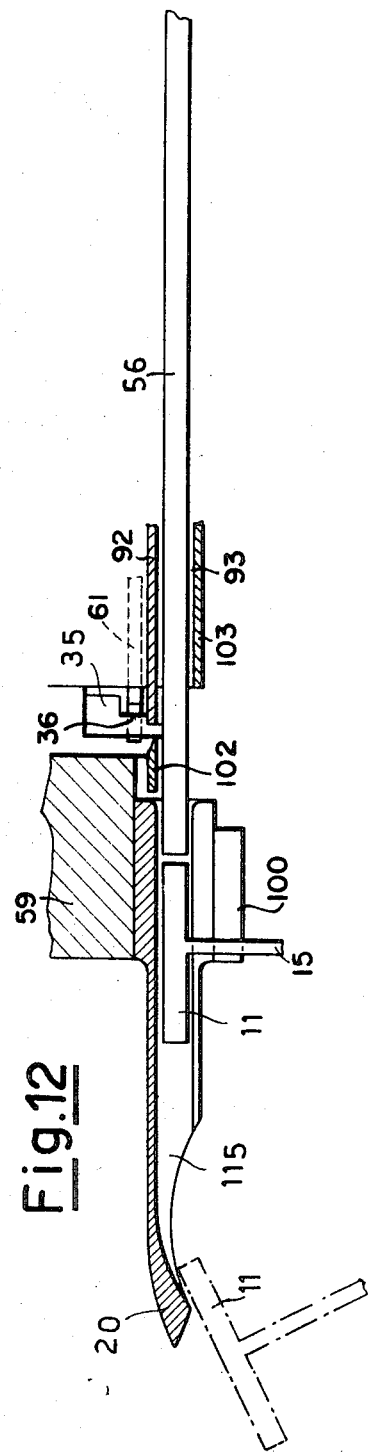
Fig.11
Fig.12 ial to the supporting rod 35 by a collar 36 which

DEVICE FOR FIXING LABELS TO A SUPPORTING BODY

The present invention relates to an improved device for fixing labels to a supporting body, such as for example a fabric, of the type described and illustrated in the U.S. Pat. No. 3,103,666.

Said labels are fixed to the support by means of a connecting element consisting of an anchoring body, a thickened body of button, and a filament joining said bodies.

Preferably the anchoring body, button and filament are formed as a single piece of pressed plastics material.

A plurality of said connecting elements are assembled in such a manner as to form a unit which when loaded into the device in question feeds it in a continuous manner.

Briefly, the device according the U.S. Pat. No. 3,103,666 consists of a hollow needle comprising a longitudinal lateral slot and a piston which thrusts the anchoring body of a connecting element forward along the needle.

The device further comprises a kinematic mechanism which feeds in continuous succession connecting elements assembled to form a unit in such a manner that the anchoring body of each element is brought each time into alignment with said needle, and comprises means for cutting each connecting element from said unit when the anchoring body of the element considered is brought into alignment with the needle.

Such a device has the disadvantage that the operation of said piston which thrusts the anchoring body of the connecting element forward along the needle, the operation of said kinematic feeding mechanism and said cutting means are interconnected, because of which if any of said parts is broken it is necessary to disassemble the whole device in order to carry out repair, with considerable loss of time.

The object of the invention is that of obviating this disadvantage and for this purpose a device is provided of the above stated type in which said kinematic mechanism which feeds in continuous succession the assembled connecting elements is wholly contained in a piece housed in a freely removable manner in the body of the device and is not constrained in any way with the other members of this latter, because of which in the case of a fault said piece is easily removable and replaceable.

These and other characteristics, objects and advantages of the present invention will be more evident from the following description made by way of example with reference to the accompanying drawings in which:

FIG. 1 is a plan view of a single connecting element used in the device according to the invention;

FIG. 2 is an elevation of a unit consisting of a plurality of connecting elements;

FIG. 3 is a plan view of the unit shown in FIG. 2;

FIG. 4 is a lateral elevation of the device according to the invention in the rest position;

FIG. 6 is a lateral elevation similar to that of FIG. 5 showing the device in the working position;

FIG. 7 is a section through the line VII—VII of FIG. 5;

FIG. 8 is a front elevation of the device showing also the unit of FIG. 2 in the loaded position in the device;

FIG. 11 is an enlarged detail of FIG. 10;

FIG. 12 is the same detail of FIG. 10 illustrating the separation by means of cutting the connecting element from said unit and its expulsion through the needle of the device;

FIG. 17 is a detail of the needle of the device inserted in a body, for example a fabric, on which a label is to be fixed;

FIG. 18 is a detail of a label fixed to said body by means of the device in question.

Figure 5:
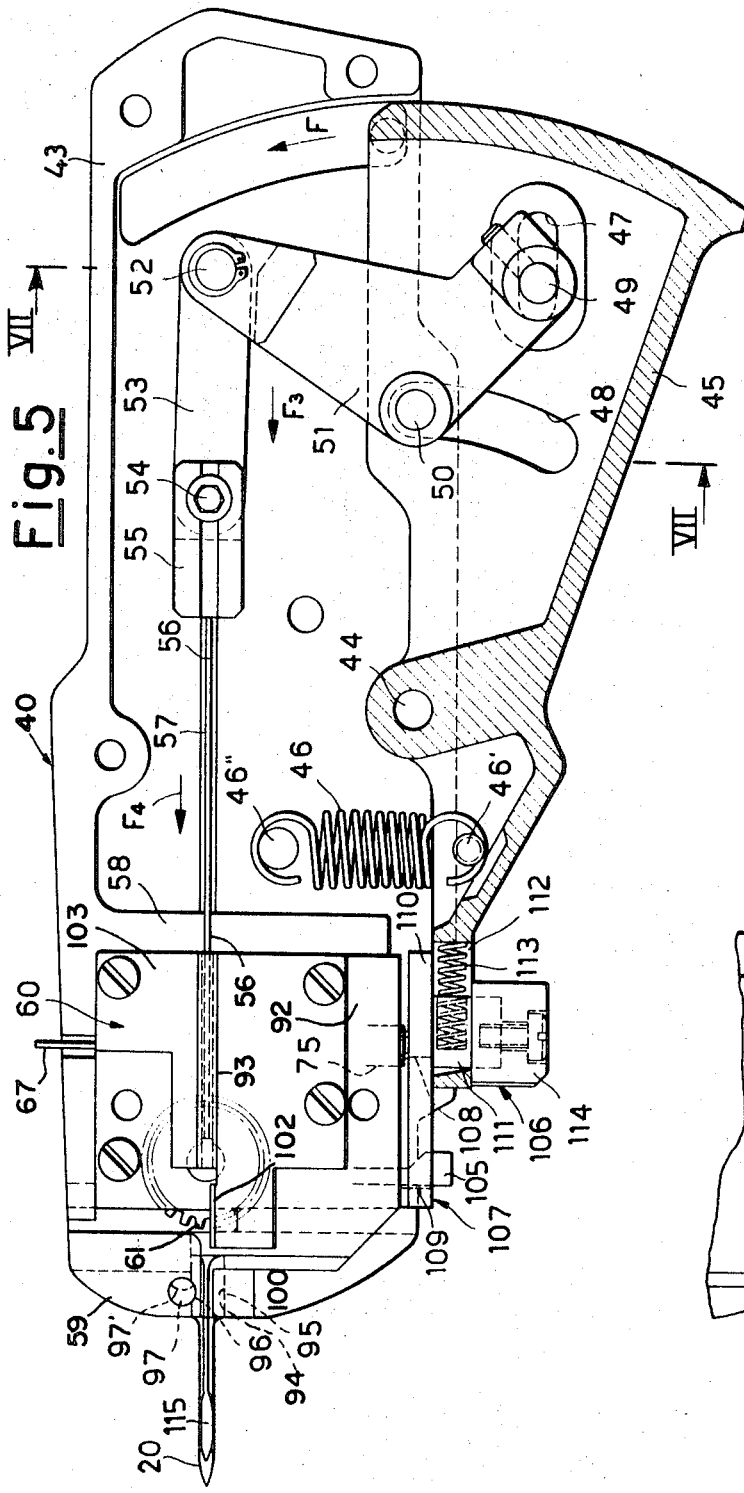
FIG. 5 is a lateral elevation similar to that of FIG. 4 with sectioned parts showing the device in the rest position with its side removed.

With reference to the drawings, FIG. 1 shows a connecting element consisting of an anchoring body 11 and a button 13 connected together by means of a filament 15 so as to form a single body.

Said connecting element is preferably made of flexible plastics material, for example nylon, and the filament 15 is the thinnest possible compatible with the strength of the material used.

FIGS. 2 and 3 show a unit consisting of a plurality of elements equal to those shown in FIG. 1, said unit being such as to feed in a continuous manner the automatic device in question for fixing labels.

The unit comprises a plurality of connecting elements 30 connected to a supporting rod 35 by a collar 36 which preferably comprises a thin section 37 immediately adjacent to the anchoring body 11, so that each connecting element can be easily removed from said rod 35.

FIGS. 4–17 illustrate a preferred embodiment of a device according to the invention for fixing labels to a supporting body, such as a fabric, using the connecting elements illustrated in FIGS. 1, 2 and 3.

With particular reference to FIGS. 4–11, said device, generically indicated by the reference numeral 40, comprises structurally a casing 41, preferably of plastics material, made in two parts 42 and 43 suitably assembled (FIG. 7).

Between said parts 42, 43 comprising the casing 41, a box lever 45 is pivoted at 44 the rotation of which in the direction of arrow F inside the casing is opposed by the action of a return spring 46 fixed at one extremity 46' to the lever 45 and at its other extremity 46'' to the casing 41.

Guide slots 47, 48 are formed on the lateral walls of said box lever 45 in symmetrical positions, in which slide pivots 49, 50 respectively of an angular connecting element 51 housed inside the lever 45, said element 51 being further pivoted by means of a pivot 52 to a link 53.

At the free extremity of said link 53 is pivoted a piece 55, by means of a pivot 54, from which a stem 56 projects. Said piece 55 slides in lateral guides 57 formed in the internal opposite surfaces of said parts 42, 43, comprising the casing 41 of the device.

The front part of the casing 41 is separated from the rest of the casing by a transverse wall 58, which forms with the front wall 59 a compartment in which a metallic box-like piece, generically indicated by the reference numeral 60, is housed in a freely removable manner, and contains a kinematic mechanism for feeding the connecting elements 30 in the device.

Figure 14:
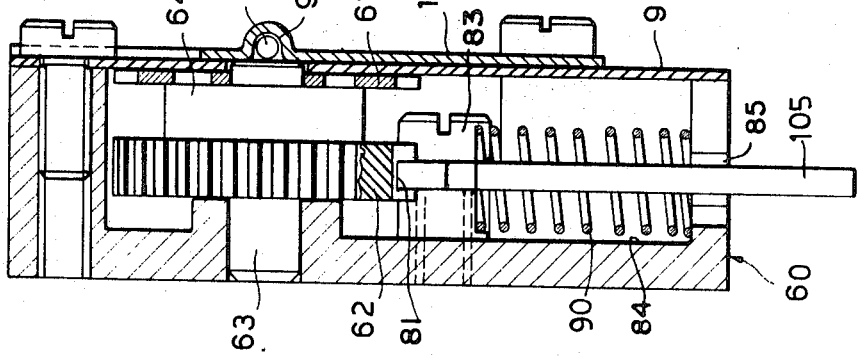
FIG. 14 is a section through the line XIV—XIV of FIG. 13.
Figure 13:
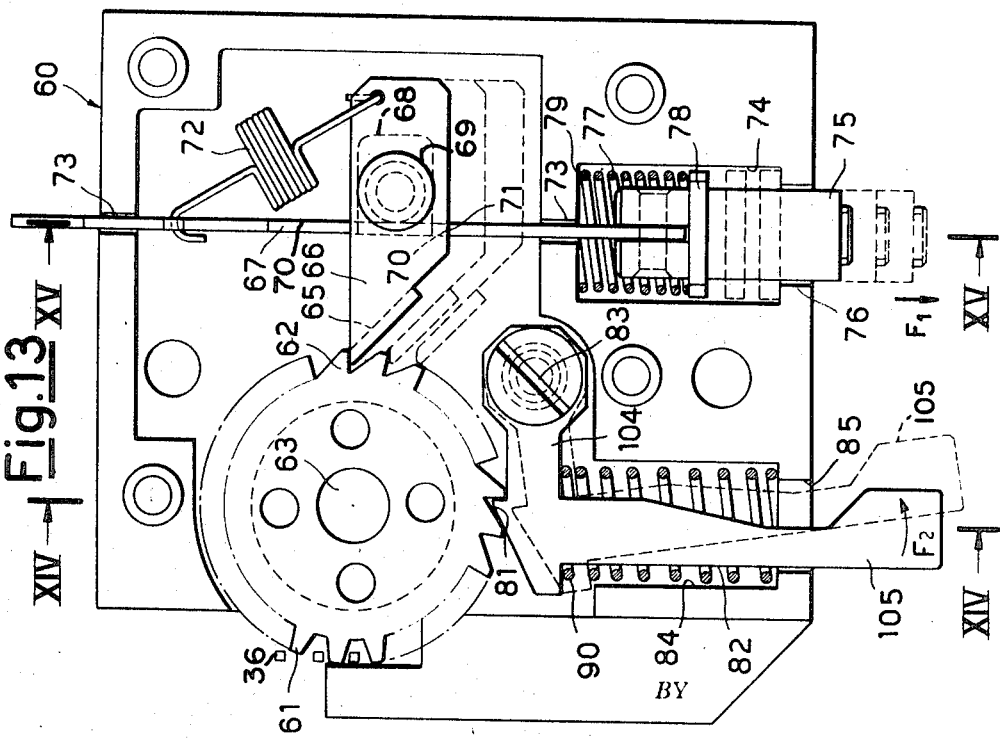
FIG. 13 is an enlarged detail of the kinematic feeding mechanism for the connecting elements in the device.

With particular reference to FIGS. 12, 13 and 14, said kinematic mechanism comprises a straight tooth gear 61 and a saw tooth gear 62 rigid with a pivot 63 and distanced one from the other by a distance piece 64 (FIG. 13).

With said saw tooth gear 62 the nose 65 of an operating lever 66 co-operates, constrained perpendicularly in a slightly oscillating manner by a vertical rod 67 in the following way.

Figure 15:
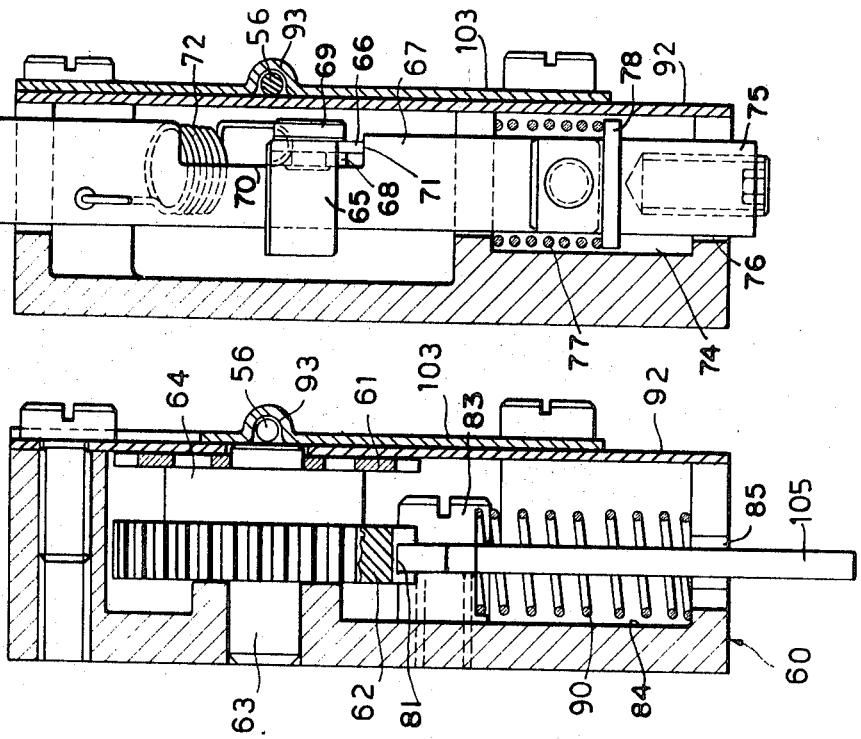
FIG. 15 is a section through the line XV—XV of FIG. 13.

With particular reference to FIGS. 11 and 15, a portion 68 of said rod 67 is bent perpendicular to it, and to which said lever 66 is constrained by means of a pivot 69, and passes through the opening 70 formed in the rod 67 after having bent the portion 68. As is clearly seen in FIG. 13, the lever 66 rests on the lower edge 71 of said opening 70.

Further, the lever 66 is connected to the rod 67 by means of a return spring 72.

The rod 67 slides vertically from top to bottom and vice versa in grooves 73 formed in the piece 60, this sliding being controlled in the following manner.

The lower terminal part of the rod 67 extends into a space 74 of the piece 60 and is provided with a piston 75 which is partly housed in the space 74 and partly projecting from it through an opening 76.

The piston 75 and consequently the rod 67 is thrust so that it slides in the direction of the arrow $F_1$ by a return spring 77 acting between a shoulder 78 rigid with the piston 75 and the upper part 79 of the chamber 74.

A corresponding tooth 81 of a two arm lever generically indicated by the reference numeral 82 is also engaged with the saw tooth gear 62.

Lever 82 pivots on pivot 83 which extends through an opening at the extremity of arm 104 and is mounted on piece 60, while the other arm 105 projects downwardly from arm 104 and extends outwardly of piece 60 through opening 85 in the lower wall of chamber 84. A return spring 90 is inserted on the arm 105 of the lever 82 and acts between the lower part of the chamber 84 and the arm 104 so as to counter the rotation of the lever 82 in the direction of the arrow $F_2$ in the position indicated by broken lines in FIG. 13 as will be explained hereinafter.

Figure 16:
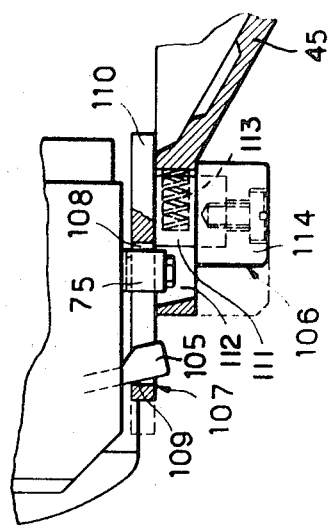
FIG. 16 shows the detail indicated by the arrow 106 in FIG. 5 in the position in which operation of the device is prevented.
Figure 9:
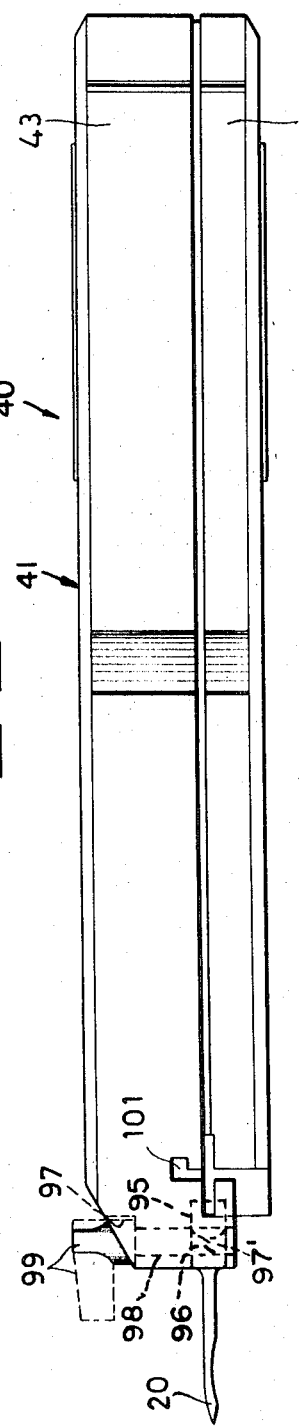
FIG. 9 is a plan view of FIG. 4.
Figure 10:
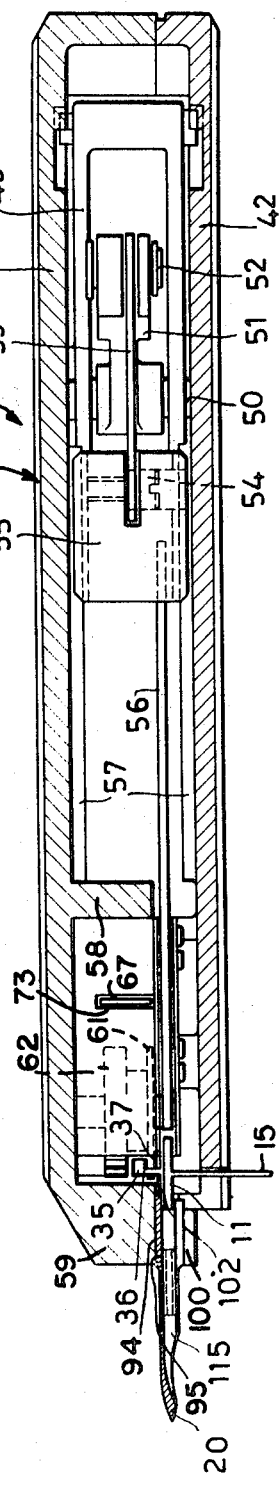
FIG. 10 is a sectional view through the line X—X of FIG. 4 showing a connecting element of the unit of FIG. 2 in position ready to be separated from the unit and expelled through the needle of the device.

FIG. 5 shows that said piston 75 and said arm 105 of the lever 82 cooperate with a piece generically indicated by the reference numeral 106 supported at the front extremity of the lever 45 so that it slides forwards and backwards from the position shown in FIG. 5 to the position shown in FIG. 16 and vice versa.

Said piece 106 comprises an upper plate 107 having a longitudinal opening 108 and two front and back terminal portions 109 and 110 respectively.

A pivot 111 is rigid with said plate 107 and housed in a slidable manner (from the position shown in FIG. 5 to the position shown in FIG. 16) in a seat 112 formed in the front part of the lever 45. A return spring 113 counters said sliding. A knob 114 rigid with said pivot 111 is provided for manually controlling the sliding of piece 106.

The box-like piece 60 with the previously described kinematic mechanism contained in it is closed by a cover 92 on which a plate 103 is fixed comprising a passage 93 for the stem 56 (FIGS. 14 and 15).

In addition the front part of said plate 103 is provided with a cutter 102 (FIGS. 5, 11 and 12) for the purpose explained hereinafter.

FIG. 11 shows a needle 20 which comprises a longitudinal slot 115 along one of its sides, said needle 20 being removably fixed to the front part of the device in the following manner.

With reference to FIGS. 5 and 8, the needle 20 is inserted in a longitudinal hole 94 formed in the front part of the casing 41 co-axial with the stem 56. Said hole 94 comprises a lateral slot 100.

The back part of the needle 20 comprises a thickened part 95 with a groove 96 with its transversal section in the form of a circumference arc.

A pivot 97 acts in said groove 96, inserted in a hole 98 in the casing 41 perpendicular to and intersecting the hole 94.

Said pivot 97 comprises a groove 97' corresponding to the groove 96 of the needle 20 and is rotable between two positions: a first position in which the groove 97' is situated inside the groove 96 so as to prevent extraction of the needle 20, and a second position, at 90° to the first, in which the groove 97' is inside the groove 96 so as to permit the extraction of the needle so as to replace it when necessary.

A tongue 99 rigid with the extremity of the pivot 97 projects from the casing 41 for easily controlling the rotation of the pivot.

Between the back extremity of the needle 20 and the front extremity of the stem 56, and perpendicular to them, a passage 101 (FIG. 9) extends upwards through the casing 41 of the device, communicating with the outside, and of section equal to the terminal right hand part of the unit illustrated in FIG. 3, the unit being loaded into the device through said passage 101.

The operation of the device of the foregoing description is as follows.

A unit consisting of a plurality of connecting elements 30 (FIG. 2) is inserted into the device through the passage 101 with the collar 37 of the connecting elements between the teeth of the gear 61 (FIG. 13) and with the anchoring body 11 of the first connecting element co-axial with the stem 56 and the needle 20.

With particular reference to FIGS. 17 and 18, after having inserted the needle 20 through the hole 22 of the label 24, the needle is inserted into the body where said label is to be fixed, for example a fabric 26.

At this point the lever 45 is operated manually, rotating it in the direction of the arrow F so as to bring it from the position shown in FIG. 5 to the position shown in FIG. 6, in this manner causing a rotation in the direction of the arrow $F_3$ of the element 51 and a consequent forward sliding in the direction of the arrow $F_4$ of the stem 56, which thrusts the anchoring body 11 of the connecting element along the slot 105 of the needle 20. With reference to FIGS. 11 and 12, it is seen that during this movement of the anchoring body 11 of the connecting element, this latter is separated from the unit by the cutter 102 which cuts the thin section 37 of the collar 36 which connects the connecting elements to the support rod 35 so as to form said unit.

When the anchoring body 11 is completely expelled from the needle 20 (in the position indicated with broken lines in FIG. 12) the needle can be withdrawn from the fabric 26 leaving the anchoring body 11 on that side of the fabric opposite the label 24 (FIG. 18).

In this manner the label 24 is fixed to the fabric 26.

Simultaneously with this, the rotation of the lever 45 from the position shown in FIG. 5 to the position shown in FIG. 6 frees the piston 75 from the action of the portion 110 of the plate 107, said piston thrust by the spring 77 being brought into the broken line position in FIG. 13, pulling the rod 67 rigid with it and the lever 66 downwards, this latter also being brought into the dotted line position of the drawing.

The lever 66 must pass over a tooth of the gear 62 in order to bring itself into said broken line position, and this takes place in the following manner.

During the downward sliding of the rod 67 the nose 65 of the lever 66, striking against said tooth of the gear 62, causes the lever 67 to rotate in the clockwise direction, against the action of the spring 72, thus liberating the nose 65 from its engagement with the tooth of the gear and permitting the lever 66 to be brought into said broken line position. As soon as the nose 65 has passed over the tooth of the gear, the action of the spring 72, previously loaded by the rotation of the lever 66, returns this latter into the position perpendicular to the rod 67.

When the lever 45 is released, the action of the spring 46 returns it into the position shown in FIG. 5, and as said spring 46 is stronger than spring 77 which thrusts the piston 75 in the direction of the arrow $F_1$, the portion 110 of the plate 107 thrusts the piston 75 and the rod 67 so that they slide upwards in such a manner that the nose 65 of the lever 66 engages with the gear 62 and makes this latter rotate by one tooth in the anti-clockwise direction and consequently makes the gear 61 rotate, which as it is coupled to the collar 36 of the connecting elements 30, makes the unit advance by one step so bringing the anchoring element 11 of a new connecting element in line with the stem 56 and the needle 20.

In this manner the device is automatically set for a new working cycle.

In case of jamming, the connecting elements are freed from the device in the following manner.

By acting on the knob 114 the piece 106 is brought from the position shown in FIG. 5 to the position shown in FIG. 16. In this manner the piston 75, no longer being supported by the portion 110 of the plate 107, slides downwards thrust by the spring 77 so freeing the saw tooth gear from its engagement with the nose 65 of the lever 66 in the previously described manner, and the front portion 109 of the plate 107 frees the saw tooth gear from its engagement with the tooth 81 by pulling the arm 105 of the lever 82 into the position indicated by broken lines in FIG. 12. In this manner the saw tooth gear is free to rotate so permitting extraction of the unit from the device.

The embodiments of the invention in which an exclusive property or privilege is claimed are defined as follows:

1. In a device for fixing labels to fabrics and the like by means of connecting elements consisting of a button and an anchoring body connected by a thin filament, comprising a casing, a hollow needle containing a longitudinal slot extending outwardly of said casing, a piston within said casing which thrusts said anchoring body forward along said slot of the needle, a kinematic mechanism which feeds in continuous succession said connecting elements assembled to form a unit in such a manner that the anchoring body of each element is each time brought into alignment with said needle, and means for cutting each connecting element from said unit when the anchoring body of the element considered is thrust along the slot of said needle, the improvement in which the casing is provided with a transverse wall forming a compartment and said kinematic mechanism which feeds the connecting elements in continuous succession is wholly contained in a box-like piece housed in a freely removable manner in said compartment without fixed connection to the other members of the device, whereby in the case of a fault said piece is easily removable from the said device and replaceable therein.

2. A device as claimed in claim 1, in which said means for cutting each connecting element comprise a cutting tongue forming part of said box-like piece.

3. A device as claimed in claim 1, in which said kinematic mechanism which feeds the connecting elements in continuous succession is operated by a spring housed in said box-like piece which is loaded by the release of an operating lever of said piston.

4. A device as claimed in claim 3, in which the connecting elements are fed by a toothed gear element operatively connected to said spring.

* * * * *